Sept. 7, 1926.　　　　　　　　　　　　　　　　　　1,598,804
N. L. BRUMBACK
WEIGHT OPERATED CIRCUIT CLOSER
Filed August 4, 1922
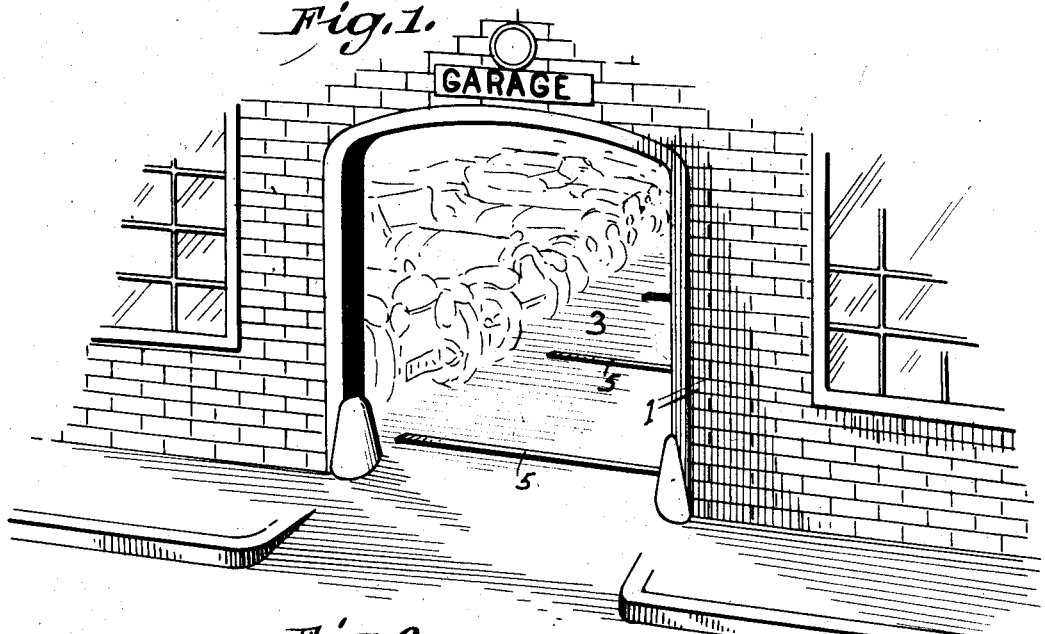
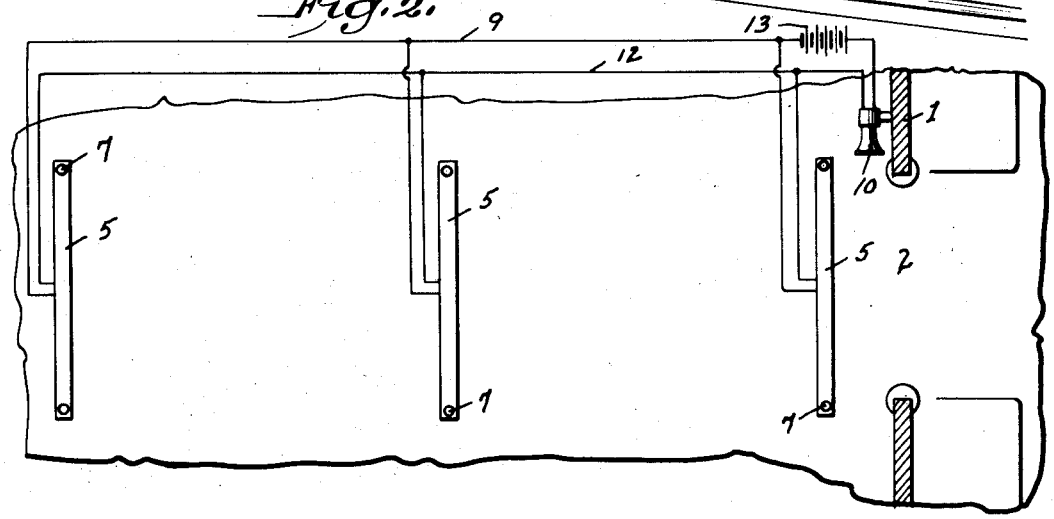
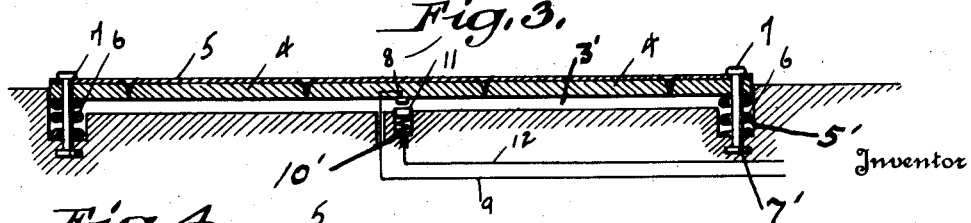
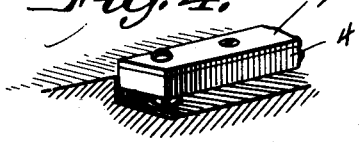
Inventor
Nathan L. Brumback
By
　　　　　　Attorney Patented Sept. 7, 1926.

1,598,804

UNITED STATES PATENT OFFICE.

NATHAN L. BRUMBACK, OF ELDORADO, KANSAS.

WEIGHT-OPERATED CIRCUIT CLOSER.

Application filed August 4, 1922. Serial No. 579,639.

The prime object of my invention is to provide means electrically operated including a horn or a bell for warning a person passing a building, such as a garage or small alley to the fact that an automobile is about to pass out of the opening of same.

A further object of the invention is to provide an electrically operated signaling system, which comprises a series of floor boards adapted to be supported on the floor of the garage at spaced intervals, the first of said floor boards being positioned just inside of the doorway and the rest of the floor boards which constitute the series of same spaced at equal distances towards the rear of the garage and each of the floor boards connected with a signal horn positioned at the opening of the building, so that as the wheels of the automobile pass over the various floor boards, an electric circuit will be closed for operating the signal horn to warn persons passing the front of the building that an automobile is about to move out of same. The invention can also be adapted for use in small alleys, whereas the building line extends out onto the sidewalk and no warning is given to persons passing the alley that a vehicle is moving out of same.

A still further object of my invention is to provide an improved electrically operated signal for use of garages, alleys, etc. which is simple in construction and operation, durable, efficient for the purpose intended, and one that can be manufactured and installed for operation at a relatively low cost.

These and like objects of the invention will be better understood as the description follows and as is specifically pointed out in the appended claim.

Referring to the accompanying drawing which forms a part of this specification and which clearly illustrates the construction and operation of my improved signaling apparatus:—

Figure 1 represents a perspective view of a garage showing the invention applied to use.

Figure 2 is a diagrammatic view of the circuits, etc.

Figure 3 is a longitudinal section through one of the floor boards, showing the manner of mounting same in the floor of a garage, and Figure 4 is an enlarged fragmentary end of one of the floor boards.

Referring to the accompanying drawing in detail, like characters will be used to designate like parts in the different views.

In the drawing, the numeral 1 indicates the front of a garage, 2 the opening leading thereto, and 3 the drive-way or floor of the garage.

The police regulations of many cities require the drivers of an automobile to sound their horns before passing out of a garage, but in a number of instances, the operator fails to comply with this regulation, which has resulted in considerable property loss and damage and also in some instances to the loss of life, due to the machine striking persons passing the entrance to the garage. My invention has been designed primarily to provide improved signaling means for indicating the exit of an automobile from the garage, regardless of the fact as to whether or not the operator of the car sounds his horn. In order to accomplish the above, the floor 3 is provided with one or more longitudinal recesses 3' formed in the surface of the floor and disposed at spaced intervals. The floor boards or bars 4, are disposed in the recesses 3' and each board is provided with a tread plate 5 secured to the top thereof in any suitable manner. The recesses 3' are provided at each end with a pocket 5' adapted to receive the upright bolts 7 having one end embedded in the bottom of the pockets, as at 7'. The ends of the floor boards are slidably mounted on the bolts 7 which pass though the boards and tread plate. Coil springs 6 are seated in the pockets 5' and surround the bolts having their upper end bearing against the floor boards, normally supporting the latter on a plane slightly above the floor of the garage.

A contact point 8 is carried by the underside of each of the floor boards intermediate its ends and a lead wire 9 extends from the contact 8 to a signal horn 10 which is positioned to one side of the opening leading into the garage. A second contact 11 is yieldably supported in a pocket 10' formed in the recess 3' intermediate its ends directly beneath the contact 8 carried by each of the floor boards 4, and a lead wire 12 connected to the contact 11 at one end and the opposite end to the horn 10. A battery 13 is positioned in the wire 9.

From the foregoing description of my invention, taken in connection with the accompanying drawing, it can be readily seen that when a machine starts to leave the garage, that the front wheels of same come in contact with the floor boards 4, thus forcing same downwardly and closing contact points 8 and 11 and causing sounding of the horn 10. As soon as the front wheels of the vehicle pass off of the floor boards 4, the springs 6 return same to the position indicated in Figure 3, thus breaking the circuit, which is again closed by the rear wheels coming in contact with the floor boards 4. From the above it can be readily seen that if three floor boards are employed in the signaling apparatus, that the machine coming from the rear of the garage and passing out of the entrance will close the circuit six different times, thus causing six soundings of the horn 10 before the machine reaches the entrance 2.

In view of the foregoing description of my invention taken in connection with the accompanying drawing, it is thought that any further explanation as to the construction, operation and objects of my invention are unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:—

In a circuit closer for a device of the character described, the combination with a driveway having a longitudinal recess in the upper surface thereof, said recess having a central and end pockets, of bolts centrally disposed in said end pockets having one end embedded in the bottom of the pockets, a bar adapted for up and down movement in said recess having its ends slidably mounted on said bolts, a tread plate covering the upper surface of said bar, springs seated in said end pockets surrounding said bolts and having their upper ends bearing against said bar, normally holding the bar in a raised position slightly above the level of the driveway, means for limiting the upward movement of the bar, a terminal yieldably supported in said central pocket of said recess, a contact carried by the underside of said bar adapted to contact with said terminal when the bar is depressed and conductor wires leading from said terminal and contact.

In testimony whereof, I have affixed my signature.

NATHAN L. BRUMBACK.